(12) United States Patent
Nebergall et al.

(10) Patent No.: US 8,845,039 B2
(45) Date of Patent: Sep. 30, 2014

(54) UNDERCARRIAGE SYSTEM FOR TRACK-TYPE MACHINE AND DEBRIS SHUNTING AWNING ASSEMBLY

(75) Inventors: Kenneth Nebergall, Canton, IL (US); Joseph F. Carter, Blaine, MN (US); Christopher R. Beasely, East Peoria, IL (US); Jeffrey M. Lakdawala, Peoria, IL (US); Stephen Garnett, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 864 days.

(21) Appl. No.: 12/967,716

(22) Filed: Dec. 14, 2010

(65) Prior Publication Data

US 2012/0146400 A1 Jun. 14, 2012

(51) Int. Cl.
 *B62D 55/088* (2006.01)
(52) U.S. Cl.
 CPC .................. *B62D 55/0882* (2013.01)
 USPC .......................... 305/109; 305/100
(58) Field of Classification Search
 USPC ................................. 305/109, 107
 See application file for complete search history.

(56) References Cited

U.S. PATENT DOCUMENTS

| 2,411,408 | A | * | 11/1946 | Armington | .................. 305/109 |
| 4,553,790 | A | | 11/1985 | Boggs | |
| 5,967,242 | A | | 10/1999 | Caron et al. | |
| 6,267,458 | B1 | | 7/2001 | Hansen | |
| 2006/0028066 | A1 | | 2/2006 | Yamamoto | |
| 2008/0150355 | A1 | | 6/2008 | Breton | |

FOREIGN PATENT DOCUMENTS

| JP | 11278300 | 10/1999 |
| JP | 2000153785 | 6/2000 |
| JP | 2010052550 | 3/2010 |

* cited by examiner

*Primary Examiner* — Glenn Dayoan
*Assistant Examiner* — Melissa A Black
(74) *Attorney, Agent, or Firm* — Baker Hostetler

(57) ABSTRACT

A debris shunting awning assembly, for an undercarriage in a ground engaging track system for a track-type machine includes an awning having a plurality of segmental plates with an assembly configuration at which the plates are coupled with the inboard side of a track roller frame and span a clearance between the track roller frame and a main frame of the track-type machine. The awning assembly is configured to direct debris through a debris path extending through a portion of a track system for the track-type machine.

20 Claims, 6 Drawing Sheets

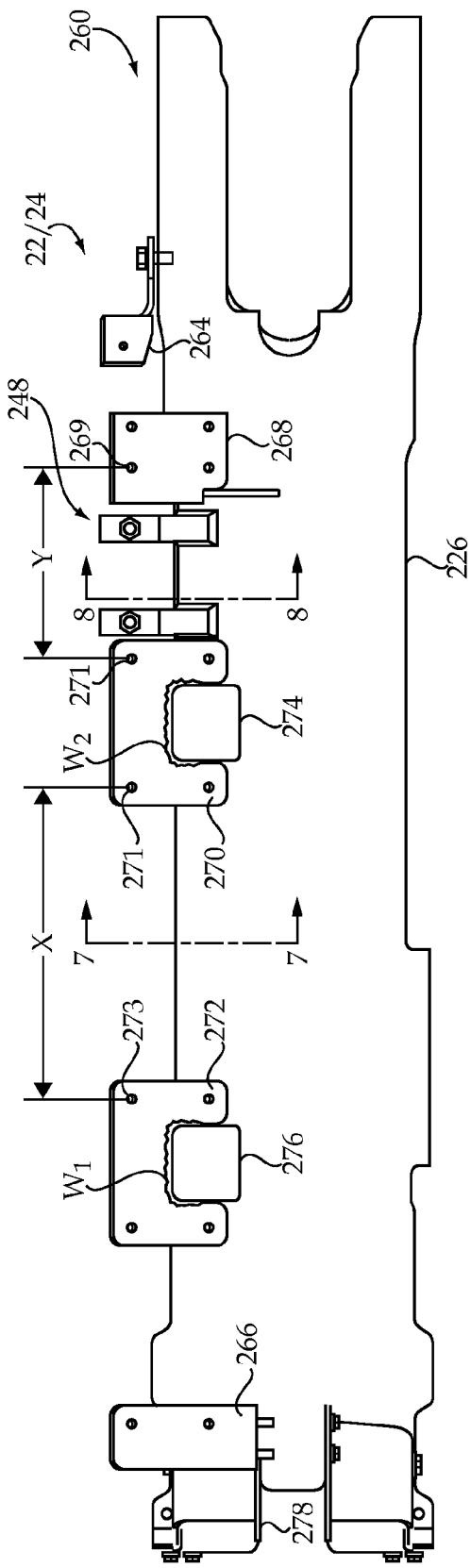
Figure 6
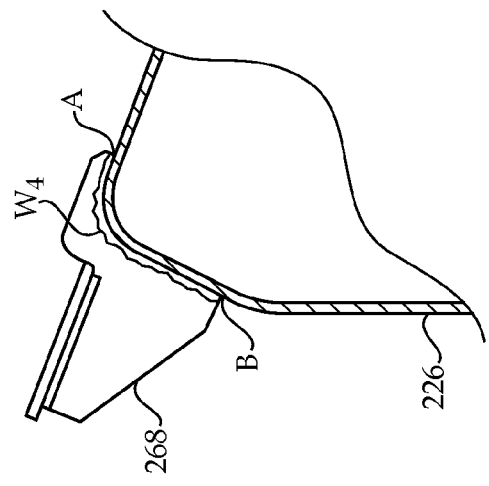
Figure 8
Figure 7

UNDERCARRIAGE SYSTEM FOR TRACK-TYPE MACHINE AND DEBRIS SHUNTING AWNING ASSEMBLY

TECHNICAL FIELD

The present disclosure relates generally to track-type machines, and relates more particularly to directing debris through a debris path extending through a track system in a track-type machine by way of a debris shunting awning assembly.

BACKGROUND

Track-type machines are used in a wide variety of environments for a great many different tasks. The use of ground engaging tracks rather than wheels tends to impart better traction and durability. Construction, road building, forestry, mining, and landfills are common examples of track-type machine service environments. As will be familiar to many, machines used in such environments are commonly tasked with digging, distributing, compacting, and otherwise interacting with loose materials. As a result track-type machines, and notably track-type tractors, often drive over and/or push through piles of loose material which can intrude into and/or be pushed on top of the track systems While track systems are typically ruggedly constructed to withstand the harsh conditions often encountered, engineers have recognized for many years that addressing the intrusion of debris into and among components of a track system in a track-type machine can extend service life. Rocks making their way between rotating components of a track system in the track chain itself are one example where mechanical stress and wear on track system components occurs. Idler recoil mechanisms are often used in ground engaging track systems to enable rocks and the like to pass through the track or be crushed without unduly stressing the components. In other instances, relatively soft material such as mud can become packed into components of the track system and have various deleterious consequences. Various strategies are known in which track chain and/or idlers and sprockets are shaped such that mud, etc., can be pushed out from among the track system components by way of track operation. Striker bars and the like have also been routinely mounted to track systems in an attempt to knock off debris stuck to the track. There is, however, ample room for improvement, as manual track cleaning is still often necessary, and tends to be quite labor intensive.

SUMMARY OF THE DISCLOSURE

In one aspect, a track-type machine includes a main frame, and a ground engaging track system having a track roller frame coupled with the main frame. The track system further includes a drive sprocket, an idler, and a track chain extending about and contacting each of the drive sprocket and the idler. The track system further includes an inboard side facing the main frame, and an outboard side, and each of the track roller frame and the track chain are positioned at a clearance with the main frame on the inboard side. A debris path includes an entrance segment defined at least in part by the main frame and the track chain, an exit segment defined at least in part by the track roller frame and the track chain, and a middle segment extending between the entrance and exit segments. The track-type machine further includes a debris shunting awning assembly having an awning for directing debris through the middle segment of the debris path, and spanning a majority of the clearance between the track roller frame and the main frame in both fore to aft and inboard to outboard directions.

In another aspect, an undercarriage system for a track-type machine includes a track roller frame having a front end defining an idler pocket, a back end, an outboard side, and an inboard side, and the track roller frame further including a front main frame connector positioned on the inboard side adjacent to the front end, and a back main frame connector, for coupling the track roller frame with a main frame of the track-type machine. The undercarriage system further includes a debris shunting awning assembly mounted to the track roller frame and including an awning projecting from the inboard side, and a plurality of supports for the awning coupled with the track roller frame. The track roller frame includes a frame length in a fore to aft direction between the front end and the back end, and the awning includes an awning length in the fore to aft direction which is equal to at least a majority of the frame length, and an awning width, such that the awning spans a majority of a clearance between the track roller frame and the main frame when the track roller frame is coupled with the main frame.

In still another aspect, a debris shunting awning assembly is provided, for an undercarriage in a ground engaging track system having a track chain and a track roller frame with a front end defining an idler pocket, and a back end, and where the track roller frame is configured to couple with a main frame by way of front and back main frame connectors positioned on an inboard side of the track roller frame. The debris shunting awning assembly includes an awning having a plurality of segmental plates each with a different geometric footprint and including inboard and outboard plate edges, and upper and lower plate surfaces, and having an assembly configuration at which the plurality of segmental plates are coupled with the inboard side of the track roller frame and together span a majority of a clearance between the track roller frame and the main frame in each of fore to aft and inboard to outboard directions. The awning assembly further includes a plurality of supports for the plurality of segmental plates, each of the plurality of supports being configured to attach to at least one of the segmental plates and to the inboard side of the track roller frame, in the assembly configuration. The plurality of segmental plates together define a uniform outer edge profile, a non-uniform inner edge profile, and a sloping upper surface profile, in the assembly configuration, whereby the debris shunting awning assembly directs debris through a middle segment of a debris path extending between an entrance segment defined at least in part by the main frame and the track chain and an exit segment defined at least in part by the track roller frame and the track chain.

BRIEF DESCRIPTION OF THE DRAWINGS

FIG. 6 is an elevational view of a portion of an undercarriage system according to one embodiment;

FIG. 7 is a partially sectioned view taken along line 7-7 of FIG. 6;

FIG. 8 is a partially sectioned view taken along line 8-8 of FIG. 6;

DETAILED DESCRIPTION

Figure 1:
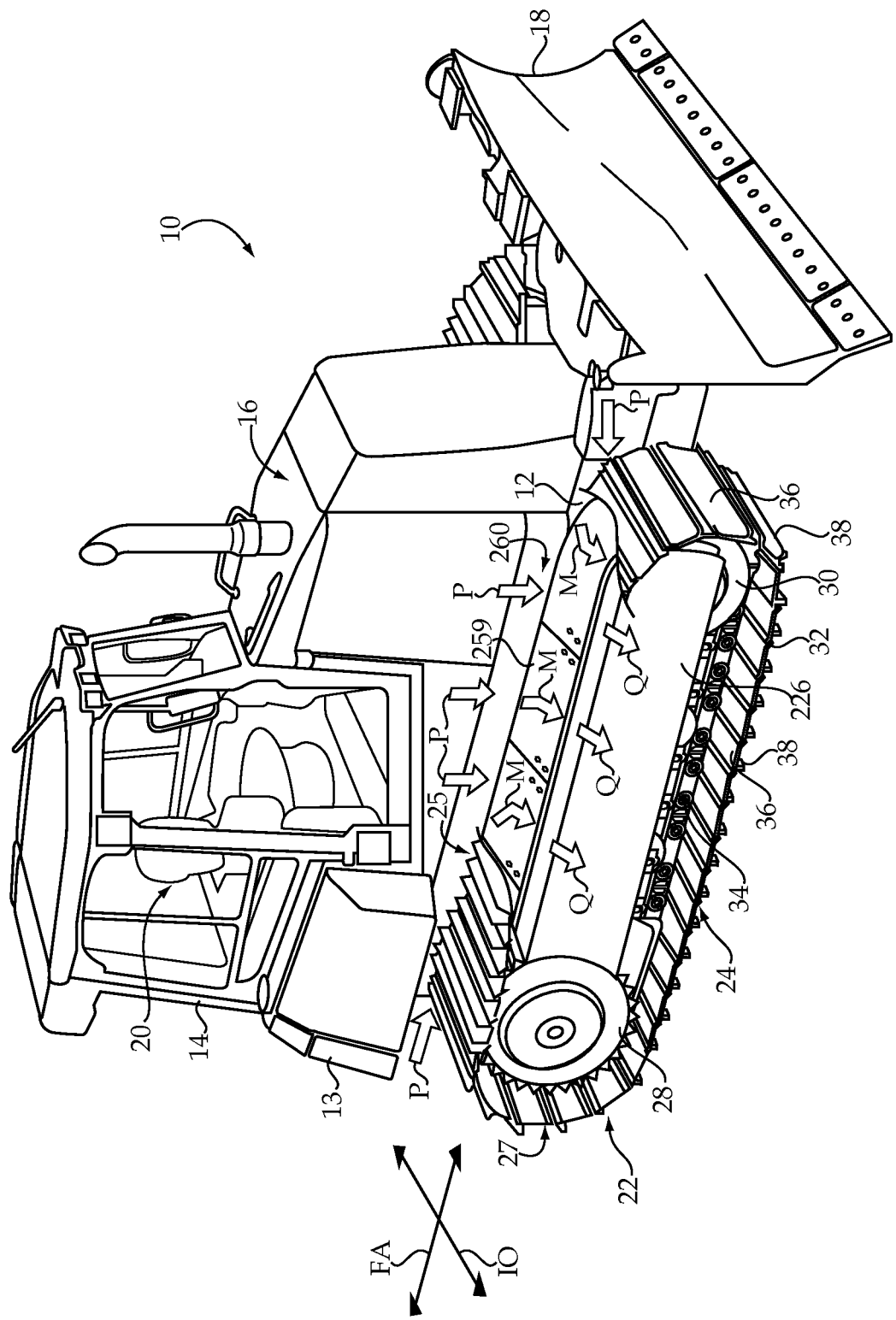
FIG. 1 is a perspective view, in partial cutaway, of a track-type machine according to one embodiment.

Referring to FIG. 1, there is shown a track-type machine 10 according to one embodiment. Machine 10 is shown in the context of a track-type tractor having an implement 18 such as a blade and suitable for use in landfill applications. The present disclosure is not thereby limited, however, and other track-type machines such as track loaders and the like are contemplated within the context of the present disclosure. Moreover, the teachings of the present disclosure are applicable outside of landfill applications, and any machine adapted following the teachings set forth herein, and used in a variety of different environments, will still fall within the scope of the present disclosure. Machine 10 includes an undercarriage system 22 having a ground engaging track system 24, features and details of which are further described herein. Machine 10 further includes a main frame 12 having a body 13 which includes an operator cab 14 mounted thereon. An engine compartment 16 is located forwardly of an operator control station 20 positioned within cab 14. As will be further apparent from the following description, machine 10 may be uniquely adapted to address debris accumulation and packing problems associated with undercarriage system 22.

Ground engaging track system 24 may include a track roller frame 226 coupled with main frame 12, a drive sprocket 28, an idler 30, and a track chain 32 extending about and contacting each of drive sprocket 28 and idler 30. Implement 18 is depicted as being mounted to main frame 12 inboard of track roller frame 226, but might also be coupled to track roller frame 226 itself in other embodiments. Track system 24 may further include a plurality of lower rollers 34 positioned between track roller frame 226 and track chain 32 in a conventional manner. Track chain 32 is shown as an oval track chain including a plurality of track shoes 36, each having one or more grousers 38. In other embodiments, machine 10 might include a high drive track system equipped with a front idler as well as a back idler, and a drive sprocket, in which case track chain 32 might include a non-oval track chain configuration.

Track system 24 may further include an inboard side 25 facing main frame 12, and an outboard side 27 opposite inboard side 25. Each of track roller frame 226 and track chain 32 may be positioned at a clearance with main frame 12 on inboard side 27. A debris path is depicted in FIG. 1 via a series of arrows, and includes an entrance segment shown via arrows P and defined at least in part by main frame 12 and track chain 32. An exit segment of the debris path is shown via arrows Q and is defined at least in part by track roller frame 226 and track chain 32. A middle segment shown via arrows M extends between the entrance and exit segments of the debris path. It may be noted that arrows P are shown at multiple orientations, illustrating that debris may enter into the debris path from a plurality of different directions. During operating machine 10, debris may be carried into the clearance between track chain 32 and main frame 12 at a forward location near implement 18, and also at a back location near cab 14. In particular, as machine 10 moves alternately forward and backward, debris may snag on inboard edges of track shoes 36 or grousers 38 and be carried through the clearance between track chain 32 and main frame 12. Similarly, debris may be carried onto the top of track chain 32 and fall or be forced by the weight of overlying debris through the clearance between track chain 32 and main frame 12. As noted above, machine 10 may find advantageous application to work in landfills, as the types of debris often encountered in landfills may be readily amenable to snagging on edges of track shoes 36, grousers 38, or otherwise susceptible to being dragged into the clearance between main frame 12 and track roller frame 226 and/or track chain 32.

In earlier systems, it was common for debris to become lodged in and among components of undercarriage systems in track-type machines. The present disclosure provides strategies for reducing the tendency for debris packing, clogging, etc. to occur by way of the phenomena described above as well as others. To this end, machine 10 may further include a debris shunting awning assembly 260 for directing debris through the middle segment of the debris path. In other words, debris shunting awning assembly 260 may be configured to impart a tendency for debris from entrance segment P of the debris path to be shunted generally in an inboard to outboard direction towards and through exit segment Q. Debris shunting awning assembly 260 may include an awning 259 spanning a majority of the clearance between track roller frame 226 and main frame 12 in both fore to aft FA and inboard to outboard IO directions. Another way to understand this configuration is that awning 59 blocks a portion of the clearance between components of track system 24 and main frame 12 such that regions which in earlier designs were particularly susceptible to debris packing are effectively removed from the debris path. Thus, rather than debris remaining within and among the components of track system 24, at least a portion of debris typically encountered in day to day service of machine 10 is cleared.

Figure 2:
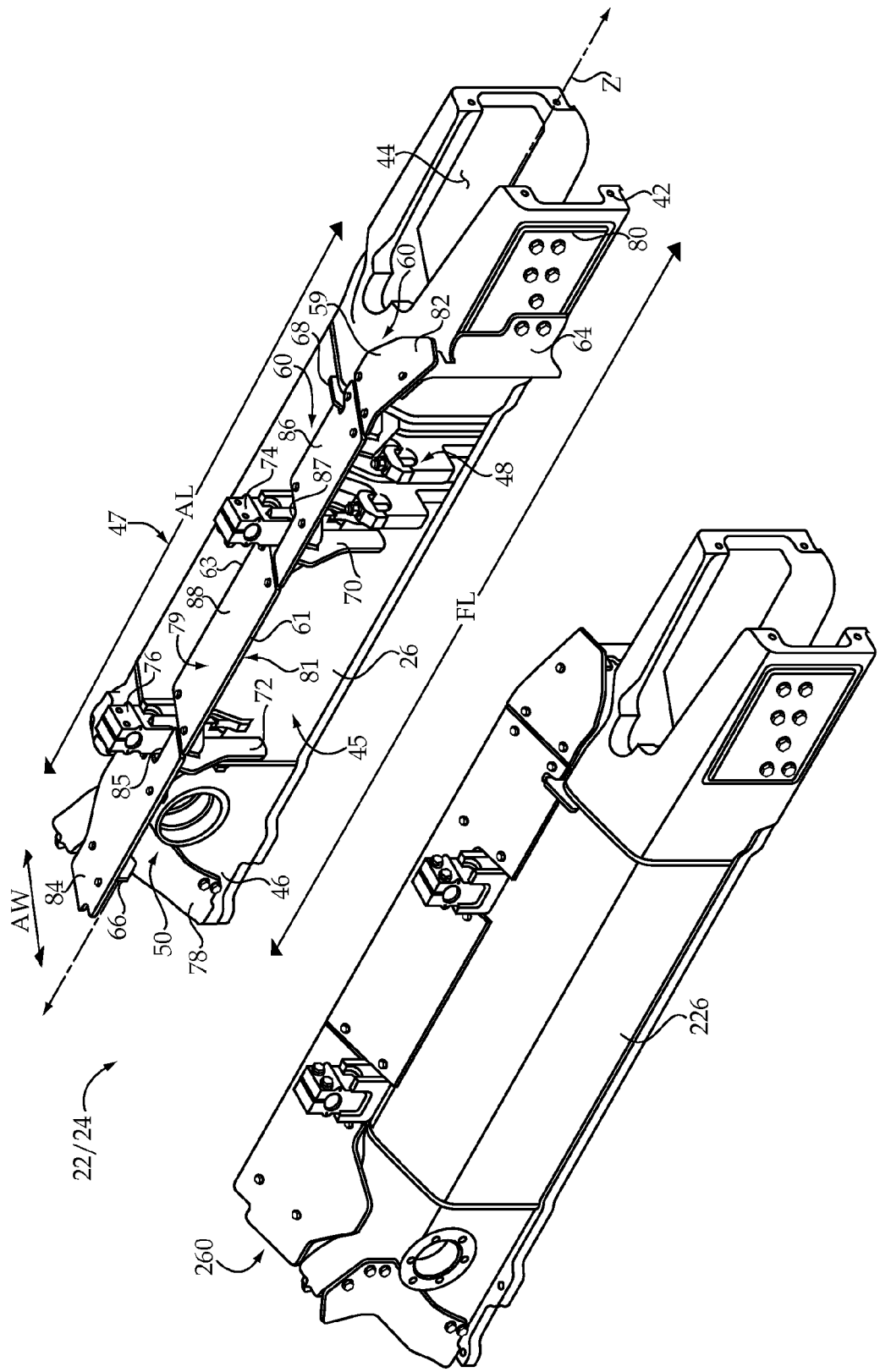
FIG. 2 is a pictorial view of an undercarriage system for a track-type machine, according to one embodiment.

Referring also now to FIG. 2, there is shown a pictorial view of portions of undercarriage system 22, including the right track roller frame 226 depicted in FIG. 1, as well as awning assembly 260. Also shown in FIG. 2 is a left track roller frame 26 of undercarriage/track system 22/24, and illustrating certain components thereof in greater detail. Each of track roller frames 26 and 226 may be elongate, and narrower in width and shorter in both height and length than main frame 12. It will thus be understood that track system 24 may include two track roller frames, and two awning assemblies which are mirror images of one another. Thus, the descriptions of parts or functions of one of the left or right track roller frames, left or right awnings, should be understood to refer similarly to the other side. Track roller frame 26 may include a front end 42 defining an idler pocket 44, and a back end 41, an outboard side 47, and an inboard side 45. Track roller frame 26 may further include a front main frame connector 48 positioned on inboard side 45 adjacent front end 42, and a back main frame connector 50 adjacent back end 46, for coupling track roller frame 26 with main frame 12. In one embodiment, front main frame connector 48 may be configured to connect with an equalizer bar, whereas back main frame connector 50 may couple with a pivot connection or the like extending to main frame 12. A left hand debris shunting awning assembly 60 similar to awning 260 described above, and including an awning 59, is mounted to track roller frame 26 and projects from inboard side 45. Track roller frame 26 may include a frame length FL in a fore to aft direction extending between front end 42 and back end 46. Awning 59 may include an awning length AL in the fore to aft direction which is equal to at least a majority of frame length FL. Awning 59 may further include an awning width AW in a direction normal to the fore to aft direction, such that awning 59 spans a majority of the clearance between track roller frame 26 and main frame 12 when track roller frame 26 is coupled with main frame 12, as noted above and still further described below.

Awning assembly 60 may further include a plurality of awning supports for awning 59 coupled with track roller frame 26. In one embodiment, the plurality of awning supports may include a total of five awning supports, namely, a front support 64, a back support 66, and first, second, and third mid supports 68, 70, and 72, respectively. A plurality of roller supports for coupling with carrier rollers further described herein are positioned on track roller frame 26 between front end 42 and back end 46, and include a first or forward roller support 74 and a second or back roller support 76. As further discussed herein, awning 59 may be shaped to extend about, and attach to roller supports 74 and 76. A set of two rear guards 78, one of which is shown, are coupled with back end 46. In the illustrated embodiment, back support 66 mounts to one of rear guards 78, while mid supports 72 and 70 mount to each of track roller frame 26 and roller supports 76 and 74, respectively. Mid support 68 mounts to track roller frame 26, and front support 64 mounts to a plate 80 which is in turn mounted to track roller frame 26 at front end 42.

Figure 3:
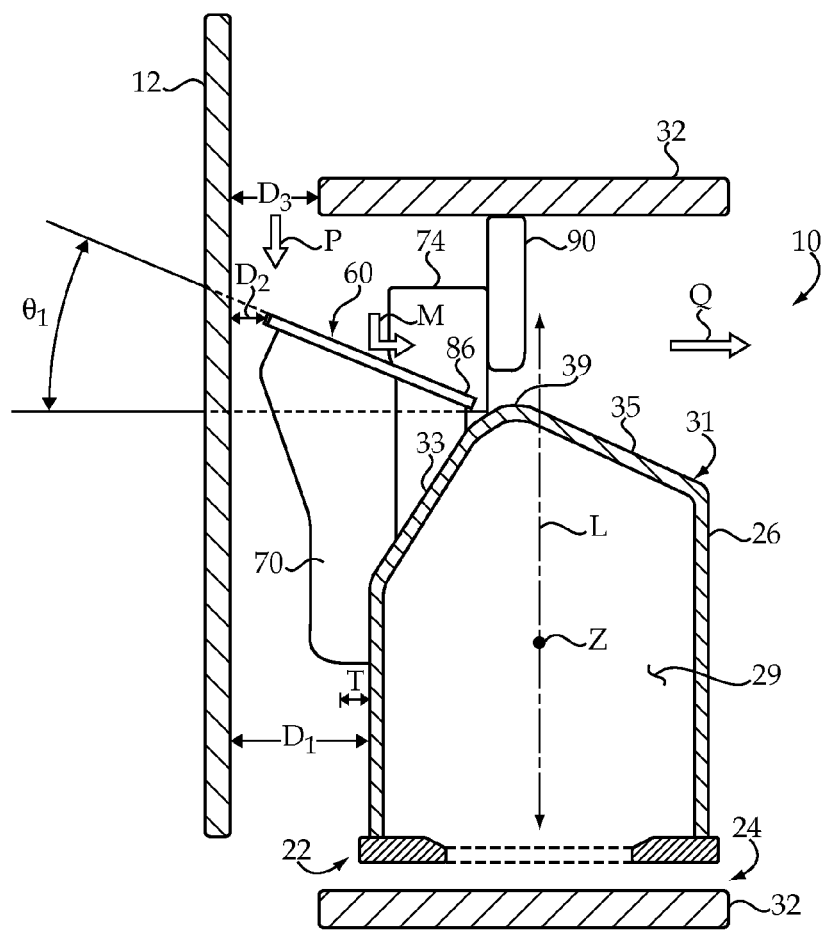
FIG. 3 is a diagrammatic sectioned view through a portion of a track-type machine according to one embodiment.

Turning now to FIG. 3, there is shown a diagrammatic sectioned view through a portion of track roller frame 26 and machine 10. In FIG. 3, a carrier roller 90 is shown mounted to roller support 74 and contacting track chain 32. Also shown in FIG. 3 is a portion of awning assembly 60 including a plate 86 spanning a portion of the clearance between track roller frame 26 and main frame 12 in the inboard to outboard direction. As shown in FIG. 3, track roller frame 26 may include a box frame having a hollow interior 29. Hollow interior 29 may open at front end 42 and communicate with idler pocket 44 such that a recoil mechanism or the like for idler 30 (not shown) may be positioned at least partially within hollow interior 29 in a conventional manner. As mentioned above, each of track roller frame 26 and track chain 32 may be positioned at a clearance with main frame 12. In FIG. 3, a first horizontal clearance distance $D_1$ is shown between track roller frame 26 and main frame 12. A second horizontal clearance distance $D_2$ is shown between awning assembly 60 and main frame 12, whereas a third horizontal clearance distance $D_3$ is shown between track chain 32 and main frame 12. Distance $D_1$ may include a relatively larger distance, distance $D_3$ may include a medium distance, and distance $D_2$ may include a relatively smaller distance. Those skilled in the art will appreciate that a certain amount of "play" between a track roller frame and a main frame in a track-type machine is often made available to allow relative movement between the components during operation in response to varying underfoot conditions, rocks and other obstructions. A fourth distance T is shown in FIG. 3 and represents an approximate travel distance that track roller frame 26 is designed to be able to move relative to main frame 12. Each of distances $D_1$, $D_2$ and $D_3$ may be greater than travel distance T such that relative movement between track roller frame 26 and main frame 12 does not allow awning assembly 60 to typically come in contact with main frame 12. Thus, in the illustrated embodiment, where awning assembly 60 is mounted to track roller frame 26 and free from contact with main frame 12, a gap between awning assembly 60 and main frame 12 will typically exist regardless of inboard and outboard movement of track roller frame 26 through travel distance T. In an alternative embodiment where awning assembly 60 is mounted to main frame 12, a similarly sized gap might be maintained between awning assembly 60 and track roller frame 26.

Figure 4:
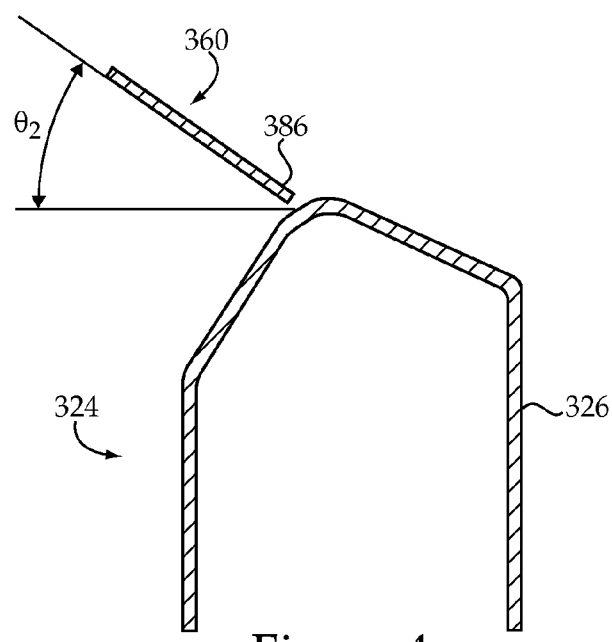
FIG. 4 is a sectioned view similar to FIG. 3, of a portion of an undercarriage system, according to another embodiment.

It may further be noted from FIG. 3 that track roller frame 26 includes an upper surface 31 having an inboard slope 33 and an outboard slope 35. Upper surface 31 further includes a peak 39 transitioning with each of inboard slope 33 and outboard slope 35, such that the illustrated track roller frame 26 includes a peaked upper surface profile in section plane normal to the frame length FL. A vertical line L passing through a longitudinal frame axis Z parallel frame length FL is also shown in FIG. 3. Awning assembly 60 may include an awning slope which is approximately equal to outboard slope 35 of upper surface 31 such that awning assembly 60 and outboard slope 35 are coplanar. In one embodiment, an angle $\theta_1$ defined by the awning slope and a horizontal plane intersecting and normal to line L may be equal to about 20 degrees. Referring to FIG. 4, there is shown a track system 324 according to another embodiment and having a track roller frame 326 and an awning assembly 360 mounted to track roller frame 326. A plate 386 of awning assembly 360 is positioned relatively steeper in the FIG. 4 embodiment than plate 86 of awning assembly 60 in the FIG. 3 embodiment, and defines an analogously measured angle $\theta_2$ which may be equal to about 35 degrees.

As alluded to above, certain track-type machines may have design features such that problems relating to debris packing or clogging between a track system and a main frame tend to occur. In the case of machine 10, the clearance between track roller frame 26 and main frame 12 includes a downwardly tapered funnel shape having a throat section defined between inboard slope 33 and main frame 12, and a stem section defined between track roller frame 26 and main frame 12 below and communicating with the throat section. Awning assembly 60 is positioned such that plate 86 blocks an upper end of the throat section. But for the use of awning assembly 60, it will be readily understood that debris entering into the clearance between track roller frame 26 and main frame 12 could fall into the funnel shaped portion of the clearance and become trapped. In earlier systems, removing such debris tended to be quite labor intensive, particularly for landfill trash. It will also be readily understood that awning assembly 60 allows debris entering into the clearance via entrance segment P to be shunted or redirected out of exit segment Q.

Figure 5:
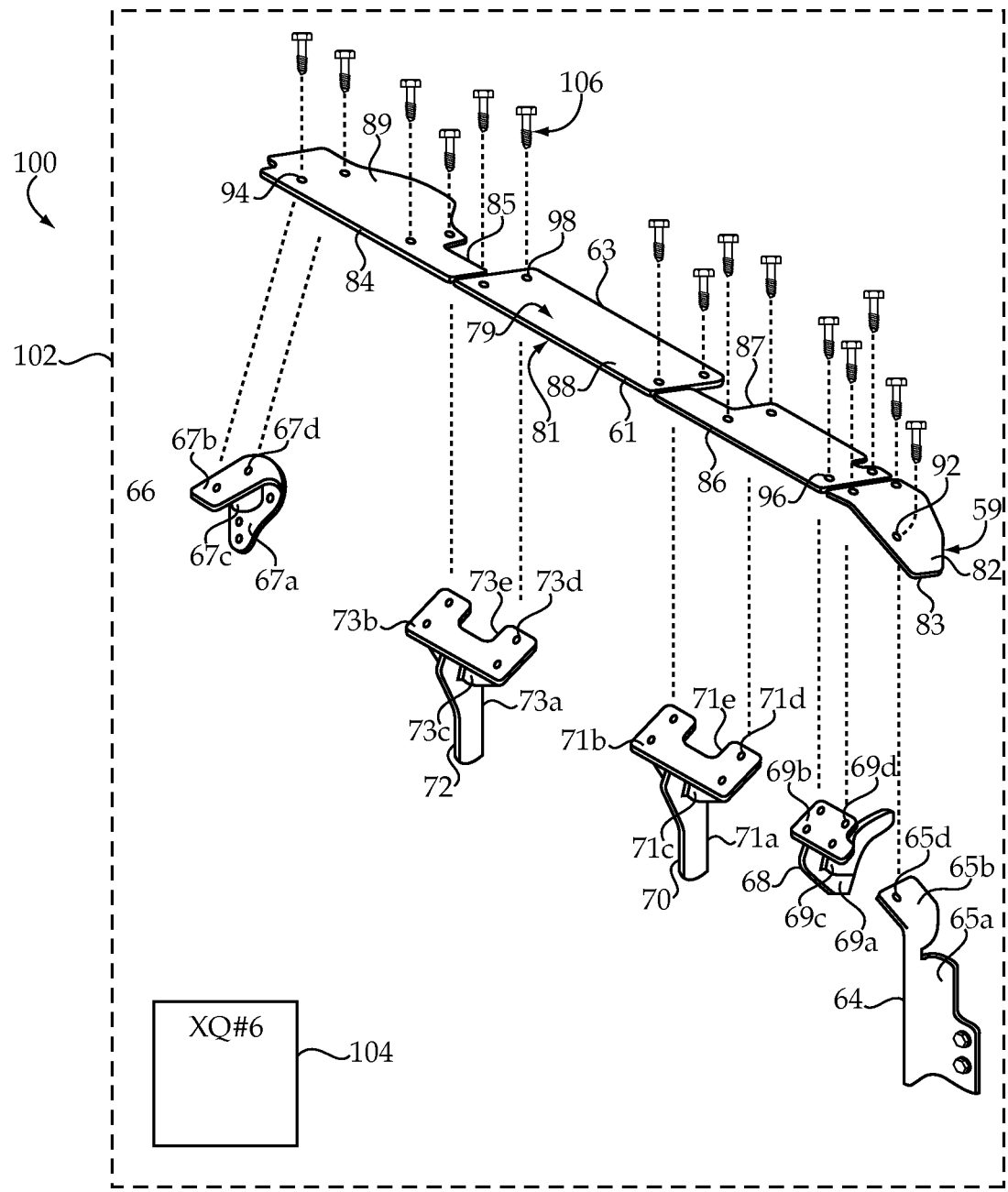
FIG. 5 is an exploded view of an awning assembly kit according to one embodiment.

Turning now to FIG. 5, there is shown a kit 100 for retrofitting a track-type tractor with awning assembly 60. Kit 100 may include a package 102 having printed installation/retrofit instructions 104, and also the various components of awning assembly 60. As discussed above, awning assembly 60 may include a plurality of awning supports, and in the illustrated embodiment includes a total of five such supports 64, 66, 68, 70, 72. Certain features of the supports are shown in FIG. 5 in detail. Front support 64 may include a base 65a adapted for coupling with track roller frame 26, and a pad 65b adapted for coupling with awning 59 which defines a bolting aperture 65d. Mid support 68 may likewise include a base 69a for coupling with track roller frame 26, a pad 69b for coupling with awning 59 and defining a plurality of bolting apertures 69d, and a stiffening member 69c attached to pad 69b and base 69a. Mid support 70 may include a base 71a, a pad 71b defining a plurality of bolting apertures, and a stiffening member 71c. Pad 71b may define a cutout 71e which is shaped complementary to and configured to position about roller support 74 as further described herein. Mid support 72 may have a configuration similar or identical to mid support 70, including a base 73a, a stiffening member 73c, a pad 73b defining bolting apertures 73d, and a cutout 73e. Back support 66 may include a base 67a, a pad 67b defining bolting apertures 67d, and a stiffening member 67a.

In one embodiment, awning 59 may include a plurality of segmental plates each having a different geometric footprint as shown. The plates may be understood as "segmental," as they each form a total of one segment of awning 59, in the illustrated embodiment for a total of four segments. The plates may include a curved leading plate 82 narrowing in a forward direction to a nose 83, and defining a set of bolting apertures 92. The segmental plates may further include a trailing or back plate 84 including a lobe 89 which projects in an outboard direction, and defining a plurality of bolting apertures 94. A first middle plate 86 is positionable adjacent leading plate 82, and defines a plurality of bolting apertures 96, and also a cutout 87 shaped complementary to roller support 74. A second middle plate 88 is positioned between first middle plate 86 and back plate 84, and includes a rectangular configuration, and defines a plurality of bolting apertures 98. Each of plates 86, 88, and 84 may include planar plates in one embodiment. A set of bolts 106, including a total of fifteen bolts in one embodiment, is provided which are configured to pass through the bolting apertures defined by the segmental plates of awning 59, and also through the bolting apertures defined by the pads of each of the plurality of awning supports 64, 66, 68, 70, 72. In one embodiment, the sets of bolting apertures defined by and located within each one of the segmental plates of awning 59 may each define a different bolt pattern for attaching the corresponding segmental plate to at least one of the awning supports. In one embodiment, leading plate 82 may attach via bolts 106 to each of front support 64 and support 68. First middle plate 86 may attach to each of support 68 and support 70. Middle plate 88 may attach to each of support 70 and support 72, whereas back plate 84 may attach to each of supports 72 and back support 66.

In FIG. 5, the various components of awning assembly 60 are shown in a disassembled state. When installed for service in a track-type machine such as by mounting to track roller frame 26, plates 82, 84, 86 and 88 may be positioned in an assembly configuration such as that shown in FIG. 2 at which an inner plate edge 61 defines a uniform outer edge profile of awning 59, such as a straight line profile as shown or a profile having a constant radius of curvature, and where an outer plate edge 63 defines a non-uniform inner edge profile of awning 59 such as a non-uniformly curving profile. A "uniform" profile within the context of the present disclosure would typically be satisfied by at least two adjoining plates, within an assembly of segmental plates, having exposed plate edges when assembled which together define a straight line or a line having a constant radius of curvature. A "non-uniform" profile would be the opposite. Each of plates 82, 84, 86 and 88 may further include an upper plate surface 79 and a lower plate surface 81. In the assembly configuration, the respective plates may define a sloping upper surface profile, in one embodiment a sloping upper surface profile defined by curved leading plate 82, as well as a corresponding sloping lower surface profile.

INDUSTRIAL APPLICABILITY

As discussed above, track-type machines according to the present disclosure may be equipped with debris shunting awning assemblies at the factory, but may also be retrofitted accordingly. Referring now to FIG. 6, there is shown a top view of a portion of undercarriage system 22 as it might appear upon installing the awning supports for awning assembly 260. It will be noted that right track roller frame 226 is shown, however, consistent with the rest of the present description the discussion of retrofitting and installing the various components of awning assembly 260 will be understood as similarly applicable to installation of awning assembly 60 on track roller frame 26 described above. Retrofitting an awning assembly to a track-type machine according to the present disclosure may commence by removing the track chain from the track system within which the awning assembly is to be installed. Certain of the other track system components such as the idler, sprocket, lower rollers and carrier rollers may also be removed. The various awning supports for the awning assembly to be installed may then be attached to the track roller frame. In the case of the installation procedure depicted in FIG. 6, certain of the awning supports may be bolted to track roller frame 226 while others may be welded. In particular, a front support 264 may be bolted to track roller frame 226, and a back support 266 may also be bolted to track roller frame 226, or more particularly to a rear guard 278. A first mid support 268 may be welded to track roller frame 226, as may second and third mid supports 270 and 272. In the illustrated embodiment, mid supports 270 and 272 are welded to roller supports 274 and 276 by way of welds $W_2$ and $W_1$, respectively. In one embodiment, supports 268 and 270 may be positioned such that a linear distance Y between a backmost aperture 269 of support 268 and a frontmost aperture 271 of support 270 is equal to about 400 millimeters. "About" 400 millimeters means between 350 millimeters and 449 millimeters. Other descriptions of "about" herein should be interpreted in a consistent manner. A distance Y between a backmost aperture 271 of support 270 and a front most aperture 273 of support 272 may be equal to about 600 millimeters. In one further embodiment, X may be equal to about 608 millimeters and Y equal to about 371 millimeters. Each of welds $W_1$ and $W_2$ may include welds extending at least a majority of a contact distance between the respective awning support 270, 272, and the corresponding roller support 274, 276. In one embodiment, each of welds $W_1$ and $W_2$ may include a fillet weld about 8 millimeters wide.

Referring now to FIG. 8, there is shown a sectioned view taken along line 8-8 of FIG. 6. A weld $W_4$ is shown between track roller frame 226 and support 268 between points A and B. Weld $W_4$ may include a fillet weld which extends over an entirety of a contact length between support 268 and track roller frame 226, and may include an 8 millimeter wide weld. An identical weld may be formed between support 268 and track roller frame 226 on the side thereof which is hidden from view in the FIG. 8 illustration. Turning to FIG. 7, there is shown a sectioned view taken along line 7-7 of FIG. 6, and illustrating another weld $W_3$ between roller support 274 and support 270. Weld $W_3$ extends between points C and D and may also include an entirety of a contact length between support 270 and roller support 276, as well as an entirety of a contact length between track roller frame 226 and support 270. Like the other welds described herein, weld $W_3$ may include an 8 millimeter wide weld. An identical weld may be formed between support 270 and roller support 274 and track roller frame 226 on the side hidden from view in FIG. 7.

Once the supports are installed as described herein, each of the plates of the corresponding awning assembly may be bolted to supports 264, 266, 268 270, and 272. It will further be understood that a first subset of the awning supports of an awning assembly according to the present disclosure may be irreversibly connected with a track roller frame, such as by way of the welds process discussed above. In the case of awning assembly 260, supports 268, 270, and 272 are irreversibly attached to track roller frame 226. A second subset of the supports, supports 264 and 266, are reversibly attached to track roller frame 226. The plurality of segmental plates of awning assembly 260 may be reversibly connected with the corresponding supports. Reversible connections such as by bolting between the segmental plates of an awning assembly and the awning supports attached to the track roller frame can allow all or some of the segmental plates to be removed for track system servicing. It will be recalled that main frame connectors may be attached to a track roller frame for coupling with a main frame. In FIG. 6, an equalizer bar connector 248 is shown. It will be understood that the second plate of the awning assembly 260 would be installed approximately vertically above connector 248. Servicing or adjustment of connector 248 or other components associated with an equalizer bar is enabled via removal of the plate installed and connected with each of support 268 and support 270. Once awning assembly 260 is installed, other components of undercarriage system 22 may be reinstalled, and machine 10 returned to or placed in service.

Figure 9:
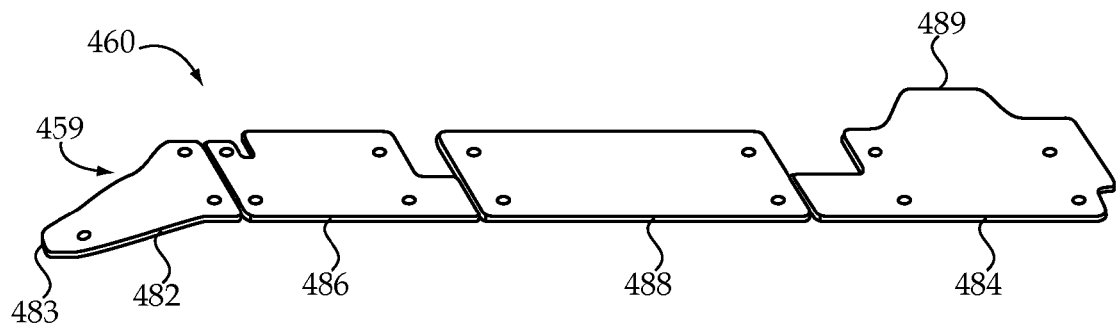
FIG. 9 is a pictorial view of a portion of an awning assembly, according to another embodiment.
Figure 10:
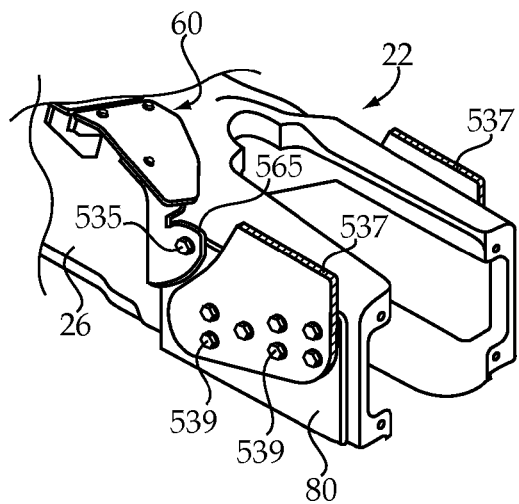
FIG. 10 is a pictorial view of a portion of an undercarriage system including an awning assembly and configured for use with a striker bar, according to one embodiment.

Turning now to FIG. 9, there is shown an awning 459 of an awning assembly 460 according to another embodiment, and having certain similarities with the previously described embodiments but also certain differences. Awning 459 includes a plurality of segmental plates 482, 484, 486, and 488. The leading plate 482 is relatively longer than leading plate 82 described above, and includes a relatively more modest downward curvature towards a nose 483. A back plate 484 includes a lobe 489 which projects somewhat further in an outboard direction than does lobe 89 described in connection with previous embodiments. FIG. 10 illustrates track system 22 where a support 564 having certain differences from support 64 described above is used to enable installation of a striker bar for undercarriage system 22. Support 564 includes a narrowing taper in a forward direction towards a pointed nose 565, and is coupled to track roller frame 26 by way of a single bolt 535 which passes through plate 80. A striker bar support 537 is coupled with track roller frame 26 by way of a plurality of bolts 539 passing through plate 80. A similar or identical plate and set of bolts may be used for another side or portion of striker bar support 537 on the side of track roller frame 26 hidden from view in FIG. 10. Adapting undercarriage system 22 for use with striker bars may include installing awning assembly 60 with the use of support 564 rather than support 64 as described above.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For instance, while debris shunting awning assemblies described herein are shown having a total of four segmental plates, a greater or lesser number of segmental plates might be used. In still further embodiments, an awning assembly contoured appropriately but having only a single plate would still fall within the scope of the present disclosure. Further still, while the embodiments described herein include a front support and a back support for the awning, each of which are attached to a total of one segmental plate in the assembly configuration, and a plurality of middle awning supports each of which are attached to a total of two segmental plates in the assembly configuration, alternatives are contemplated. Each segmental plate might be coupled with a total of two supports or a total of one support, without departing from the scope of the present disclosure. Other aspects, features and advantages with be apparent upon an examination of the attached drawings and appended claims.

What is claimed is:

1. A track-type machine comprising:
a main frame;
a ground engaging track system having a track roller frame coupled with the main frame, a drive sprocket, an idler, and a track chain extending about and contacting each of the drive sprocket and the idler, the track system further including an inboard side facing the main frame, and an outboard side, and each of the track roller frame and the track chain being positioned at a clearance with the main frame on the inboard side;
a debris path including an entrance segment defined at least in part by the main frame and the track chain and extending vertically through the clearance between the main frame and the track chain, an exit segment defined at least in part by the track roller frame and the track chain and extending horizontally through the ground engaging track system, and a middle segment extending between the entrance and exit segments; and
a debris shunting awning assembly including an awning for directing debris through the middle segment of the debris path, and spanning a majority of the clearance between the track roller frame and the main frame in both fore to aft and inboard to outboard directions, and the awning including a downward slope toward the inboard side of the track roller frame, such that the awning is oriented to redirect debris falling through the entrance segment into the exit segment.

2. The track-type machine of claim 1 wherein the awning assembly is attached to the track roller frame and free from contact with the main frame.

3. The track-type machine of claim 2 wherein the track roller frame is movable a travel distance relative to the main frame in the inboard to outboard direction, the awning is spaced from the main frame a second distance which is greater than the travel distance, and the track chain is spaced from the main frame a third distance which is greater than the second distance.

4. The track-type machine of claim 3 wherein the track chain includes an oval track chain.

5. The track-type machine of claim 4 wherein the clearance between the track roller frame and the main frame includes a downwardly tapered funnel shape having a throat section and a stem section, and wherein the awning includes a plurality of segmental plates blocking an upper end of the throat section.

6. The track-type machine of claim 4 wherein the plurality of segmental plates includes a curved leading plate, a trailing plate, and at least one middle plate positioned between the leading and trailing plates, and wherein the awning assembly further includes a plurality of supports attached to the track roller frame, and also attached to at least one of the plurality of segmental plates.

7. The track-type machine of claim 2 wherein the track system further includes a carrier roller, and a carrier roller support mounted to the track roller frame, and wherein the awning assembly defines a cutout extending about the carrier roller support and having a shape complementary with a shape of the carrier roller support.

8. The track-type machine of claim 2 wherein the ground engaging track system further includes a second track roller frame, and a second awning assembly which is a mirror image of the first awning assembly and attached to the second track roller frame.

9. An undercarriage system for a track-type machine comprising:
a track roller frame including a front end defining an idler pocket, a back end, an outboard side, and an inboard side, the track roller frame further including a front main frame connector positioned on the inboard side adjacent to the front end, and a back main frame connector, for coupling the track roller frame with a main frame of the track-type machine;

a vertically upwardly projecting support for coupling with a track carrier roller, mounted to the track roller frame; and a debris shunting awning assembly mounted to the track roller frame and including an awning projecting from the inboard side, and a plurality of supports for the awning coupled with the track roller frame;

the track roller frame including a frame length in a fore to aft direction between the front end and the back end, and the awning including an awning length in the fore to aft direction which is equal to at least a majority of the frame length, and an awning width in an inboard to outboard direction, such that the awning spans a majority of a clearance between the track roller frame and the main frame when the track roller frame is coupled with the main frame, and further having a downward slope toward the inboard side of the track roller frame for redirecting vertically falling debris horizontally through the undercarriage system.

10. The undercarriage system of claim 9 wherein the track roller frame further includes a box frame having a hollow interior open at the front end and in communication with the idler pocket, and the box frame defining a peaked upper surface profile in a section plane normal to the frame length.

11. The undercarriage system of claim 10 wherein the upper surface profile includes an inboard slope, an outboard slope, and a peak transitioning with each of the inboard and outboard slopes, and wherein the awning includes an awning slope which is steeper than the outboard slope relative to a vertical line within the section plane.

12. The track-type machine of claim 10 wherein a first subset of the plurality of supports is reversibly attached to the track roller frame, a second subset of the plurality of supports is irreversibly attached to the track roller frame, and the awning includes a plurality of segmental plates reversibly attached to the plurality of supports.

13. The undercarriage system of claim 12 wherein each of the plurality of segmental plates includes a different geometric footprint.

14. The undercarriage system of claim 13 wherein the plurality of segmental plates includes a total of four segmental plates.

15. The undercarriage system of claim 13 wherein the plurality of segmental plates includes a curved leading plate, a trailing plate, and a plurality of planar middle plates.

16. A debris shunting awning assembly, for an undercarriage in a ground engaging track system having a track chain and a track roller frame with a front end defining an idler pocket, and a back end, and where the track roller frame is configured to couple with a main frame by way of front and back main frame connectors positioned on an inboard side of the track roller frame, the debris shunting awning assembly comprising:

an awning including a plurality of segmental plates including a leading plate, a trailing plate, and a middle plate, and each having a different geometric footprint and including inboard and outboard plate edges, and upper and lower plate surfaces, and having an assembly configuration at which the plurality of segmental plates are coupled with the inboard side of the track roller frame and together span a majority of a clearance between the track roller frame and the main frame in each of fore to aft and inboard to outboard directions; and a plurality of supports for the plurality of segmental plates, each of the plurality of supports being configured to attach to at least one of the segmental plates and to the inboard side of the track roller frame, in the assembly configuration, and including a front, a back, and a middle support, for the leading, trailing, and middle plates, respectively;

the plurality of segmental plates together defining a uniform outer edge profile formed by the outboard plate edges, a non-uniform inner edge profile formed by the inboard plate edges, and a sloping upper surface profile relative to a plane defined by the middle plate, in the assembly configuration, whereby the debris shunting awning assembly directs debris through a middle segment of a debris path extending between an entrance segment defined at least in part by the main frame and the track chain and an exit segment defined at least in part by the track roller frame and the track chain.

17. The awning assembly of claim 16 wherein each of the plurality of segmental plates includes a set of bolting apertures communicating between the respective upper and lower surfaces, and each of the sets of bolting apertures defining a different bolt pattern for attaching the corresponding segmental plate to at least one of the supports.

18. The awning assembly of claim 17 wherein the leading plate includes a curved leading plate defining the sloping upper surface profile, and the trailing plate includes a lobed trailing plate, and the middle plate including a planar middle plate having a cutout formed in the inboard edge thereof, and wherein the non-uniform inner edge profile is defined at least in part by the cutout.

19. The awning assembly of claim 18 wherein the plurality of segmental plates includes a total of four plates, and the plurality of supports includes a total of five supports.

20. The awning assembly of claim 18 wherein the front support and the back support are each attached to a total of one of the segmental plates in the assembly configuration, and the middle support is one of a plurality of middle supports each of which are attached to a total of two of the segmental plates in the assembly configuration.

* * * * *